United States Patent [19]
Mogilnicki et al.

[11] Patent Number: 5,310,292
[45] Date of Patent: May 10, 1994

[54] LINEAR ROLLER TAP DRIVER ASSEMBLY

[75] Inventors: Victor D. Mogilnicki; Donald E. Meachum, both of Raleigh, N.C.

[73] Assignee: Kennametal Inc., Latrobe, Pa.

[21] Appl. No.: 994,374

[22] Filed: Dec. 21, 1992

[51] Int. Cl.$^5$ .............................................. B23G 1/46
[52] U.S. Cl. ..................................... 408/141; 470/103; 470/198
[58] Field of Search ................ 408/141, 238, 239 R, 408/240; 279/16, 22, 71; 470/103, 183, 198, 903

[56] References Cited

U.S. PATENT DOCUMENTS

| | | | |
|---|---|---|---|
| 2,772,094 | 11/1956 | Jamilkowski et al. | 408/238 |
| 3,002,206 | 10/1961 | Johnson . | |
| 3,325,837 | 6/1967 | Hartmann | 408/141 |
| 3,806,973 | 4/1974 | Hopkins . | |
| 4,090,806 | 5/1978 | Kato . | |
| 4,274,768 | 6/1981 | Kato . | |
| 4,396,317 | 8/1983 | Staron et al. | 408/141 |
| 4,547,405 | 10/1985 | Höfle et al. | 408/141 |
| 4,861,201 | 8/1989 | Cuilleron . | |
| 5,054,974 | 10/1991 | Wellach . | |
| 5,076,740 | 12/1991 | Petrie | 408/141 |

FOREIGN PATENT DOCUMENTS 1409046  6/1989  Japan .................... 408/238

OTHER PUBLICATIONS

Erickson Tool Co. Blueprint of Tap Driver Chuck Utilizing Roller.

*Primary Examiner*—Daniel W. Howell
*Attorney, Agent, or Firm*—James G. Porcelli

[57] ABSTRACT

A rotary tool connecting assembly is provided for use as a tap driver for transmitting torque to a tap. The assembly comprises an adapter receiver for receiving and securing a tap, a chuck body having one end which is detachably connectable to the spindle, and an opposing end having an axially aligned recess for slidably receiving the adapter receiver, and a mechanism for transmitting torque from the chuck body to the adapter receiver while allowing the receiver to freely axially slide within the recess of the chuck body that includes a plurality of linear roller bearings disposed between a single flat wall present on the side of the receiver and a flat bearing wall that defines a portion of the recess in the chuck body. The flat bearing wall of the chuck body is provided by a bearing insert which is compliantly seated within a slot in the chuck in order to keep its bearing wall parallel with the flat bearing wall of the adapter receiver when substantial amounts of torque are applied to the assembly. The resulting parallelism maintains a uniform rolling contact between the linear rollers and the two flat bearing surfaces completely along the length of each of the roller bearings during high torque conditions, which not only reduces friction in the axial direction but also decreases tool wear.

26 Claims, 3 Drawing Sheets

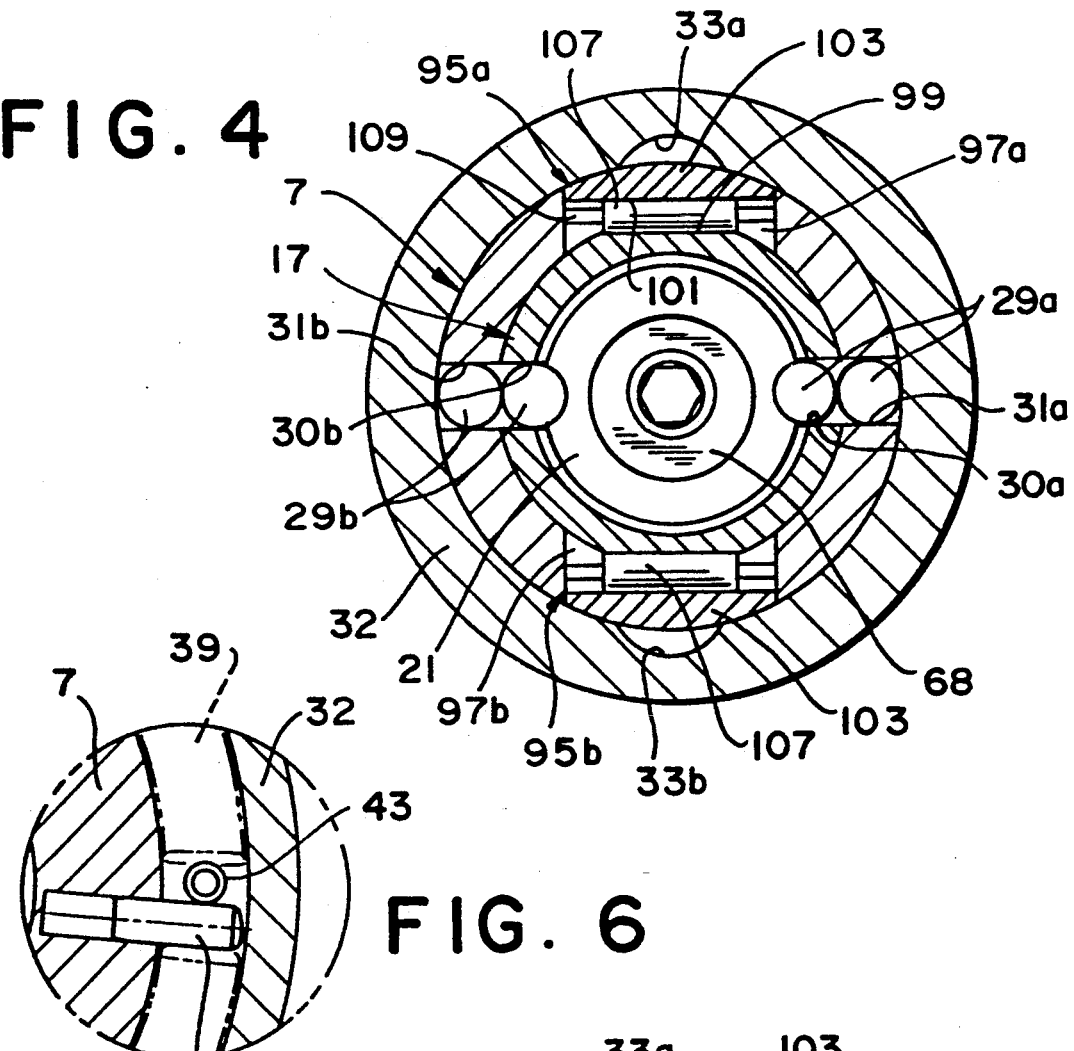
FIG. 4
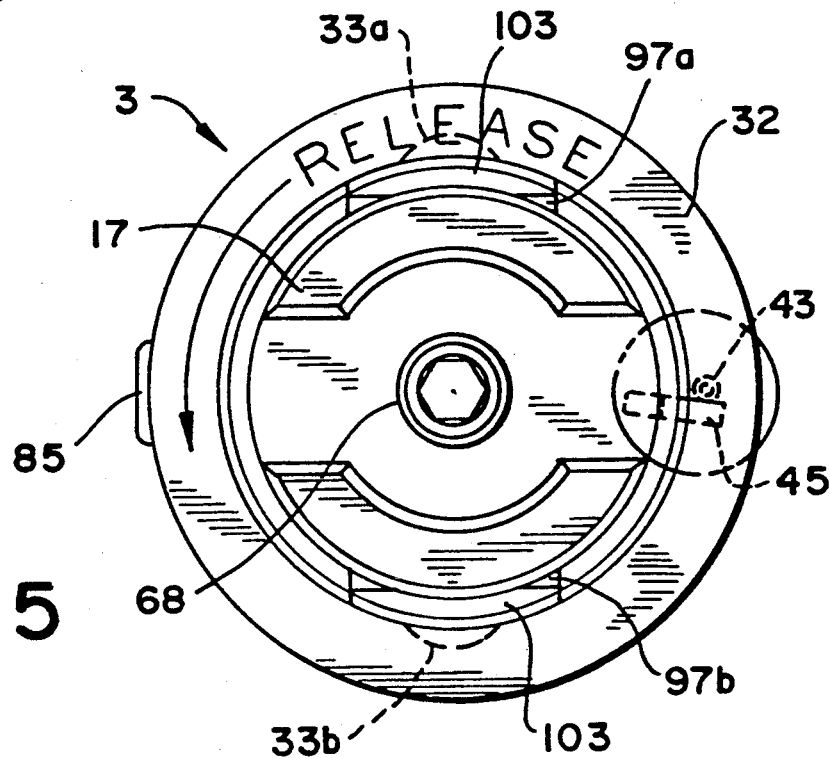
FIG. 6
FIG. 5

LINEAR ROLLER TAP DRIVER ASSEMBLY

BACKGROUND OF THE INVENTION

This invention generally relates to a rotary tool connecting assembly for transmitting torque to a rotary tool while allowing axial linear movement to occur between the tool and the connecting assembly, and is specifically concerned with a tap driver assembly.

Tap driver assemblies are known in the prior art. Such prior art tap drivers generally comprise a chuck body having one end that is detachably connectable to a torque-generating spindle, and which includes on its other end an adapter receiver assembly which is capable of coupling on to the shank end of a threading tap through an adapter. In order for the tap to properly cut threads in a metal work piece without undercutting or overcutting the threads, it is essential that the tap driver assembly include some sort of mechanism for allowing the adapter receiver which holds the shank end of tap to move along the axis of rotation of the chuck body when the tap performs a thread cutting operation. To this end, the adapter receivers of prior art tap driver assemblies are slidably movable within a complementarily-shaped recess which is generally cylindrical in shape, and concentrically aligned with the axis of rotation of the chuck body. During the operation of such tap drivers, the feed rate of the rotating spindle that applies torque to the chuck body is set slightly lower than the screw pitch of the tap so that the resulting threads created by the tap will not be distorted by overcutting, while the ability of the tap to move axially away from the chuck body during the cutting operating insures that the threads will not be distorted by undercutting.

While many prior art tap driver assemblies are capable of achieving their intended purpose, both the operating abilities and useful life span of such assemblies have been limited by the mechanisms in such assemblies which transmit torque between the tap adapter receiver and the chuck body while at the same time affording the necessary degree of axial free movement between these two components. One of the simplest of these prior art mechanisms employs a keyway that fits within a complementarily-shaped slot between the adapter receiver and the recess in the chuck body which it is slidably received within. While such a mechanism is simple and inexpensive to manufacture, the metal-to-metal contact between the keyway and the slot which receives it substantially limits the amount of torque that this mechanism can transmit before the localized pressure applied by the keyway to the slot frets the slot surfaces, causing binding and even seizing to occur at relatively modest levels of torque. To solve this problem, some prior art tap driver assemblies have replaced the keyway and slot combination with a plurality of ball bearings which are captured within one or more pairs of axially-aligned grooves disposed between the outer surface of the adapter receiver and the inner surface of the recess in the chuck body which receives it. While the use of ball bearings provides a mechanism which is capable of transmitting larger amounts of torque while still providing axial movement between the tap adapter receiver and the recess within the chuck body which houses it, the applicants have observed that the one-point contact between the ball bearings and their respective grooves can still cause fretting to occur in the walls of the grooves, which in turn causes binding to occur at various points along the axial path between the tap and the chuck body during a tapping operation. If this binding becomes severe enough, undercutting of the threads created by the tap can occur at the binding points.

To overcome the shortcomings associated with the use of ball bearings in a torque-transmitting mechanism in a tap driver, other prior art designs have attempted to use roller bearings. In contrast to the point contact that ball bearings exert on the walls of the grooves that capture them, roller bearings are capable of applying a line contact all the way across their lengths which would appear to offer some potential solution to the fretting caused by point contact. Unfortunately, no prior art tap driver assembly has yet managed to exploit all of the potential that the use of roller bearings would appear to offer in a tap driver torque-transmitting mechanism. For example, while FIGS. 1 through 3 of the Hopkins U.S. Pat. No. 3,806,973 disclose a tap driver which utilizes a plurality of roller bearings which orbit about an oval groove cut between a driving member and a driven member which in turn holds the shank of a tap, there is substantial friction between the circular end surfaces of these roller bearings and the grooves which capture them, as well as significant friction between the bearings themselves. Moreover, the precision oval cut required in both the driving and driven members requires relatively difficult and time consuming machining operations which in turn substantially adds to the cost of manufacturing this tool. Finally, the fact that all the bearing surfaces are formed by vee-grooves cut in the major housing components of the tool necessarily limits the hardness of the bearings surfaces to the hardness of the tool steel used to form these housing components, which cannot be hardened above a certain Rockwell level before the resulting embrittlement would interfere with the normal operation of these components.

Clearly, there is a need for a tap driver assembly which is capable of transferring large amounts of torque between the chuck body and the tap-holding adapter receiver while still allowing for free axial movement between the adapter receiver and the chuck body. Ideally, such a mechanism would be capable of transmitting a maximum amount of torque while imposing only a minimum of friction in the axial direction of movement without causing fretting to occur between the bearings and the surfaces they engage during the operation of the assembly. It would be desirable for such a tap driver assembly to fully exploit the torque transmitting potential of roller bearings in a tool that is relatively simple and inexpensive to manufacture, but yet has a long durability. Finally, it would be desirable if the design of the ta driver assembly allowed the bearing surfaces to be hardened separately from the other components of the assembly which must maintain some degree of elasticity.

SUMMARY OF THE INVENTION

Generally speaking, the invention is a rotary tool connecting assembly for transmitting torque to a rotary tool, such as a tap, which eliminates or at least ameliorates all of the aforementioned shortcomings associated with the prior art and fulfills all the aforementioned criteria. The rotary tool connecting assembly of the invention comprises a receiver for receiving and securing an end of a rotary tool such as a tap, a chuck body connectable to a torque-generating spindle and having an axially aligned recess in its distal end for slidably receiving the receiver, and a means for transmitting torque from the chuck body to the receiver which includes at least one linear roller bearing disposed between a single flat wall of said receiver and a flat wall that defines a portion of the recess in the chuck body. The single flat wall in the receiver and the flat of the recess are mutually parallel, and together partially form a roller-receiving cavity between the receiver and the chuck body which preferably receives at least two linear roller bearings. The linear roller bearings are preferably rotatably captured within a bearing cage in order to prevent the end surfaces of the bearings from frictionally engaging any of the wall surfaces of the chuck body, as well as each other during the operation of the assembly.

In the preferred embodiment of the assembly, the adapter receiver has a generally cylindrical outer surface, and the single flat wall provided thereon is parallel to the axis of rotation of the chuck. The opposing flat wall of the recess in the chuck is preferably defined by a single flat surface on one side of a bearing insert that is insertable within and removable from a slot in the opposing end of the chuck body. The removability of the bearing insert from the slot advantageously allows the material forming the bearing surface on the insert to be heat treated to a higher hardness level than would be appropriate for the chuck body. For example, the hardness of the material forming the bearing surface on the insert may advantageously be elevated to Rockwell C60 by selective heat treatment, which in turn will enhance the life span of the torque transmitting mechanism of the rotary tool connecting assembly. By contrast, the hardness of the chuck body may be adjusted to the substantially lower figure of Rockwell C45, which maintains sufficient resiliency in the steel forming the chuck body to allow the coupling mechanisms incorporated therein to flex without cracking. The use of a bearing insert which fits within a slot in the chuck body during the operation of the rotary tool connecting assembly also provides some degree of compliance between the bearing insert and the surrounding chuck body when substantial amounts of torque are applied to the assembly. Such compliance is an advantageous feature, as it allows the bearing surface present on the insert to remain parallel with the bearing surface defined by the flat wall on the receiver when substantial amounts of torque are applied to the assembly. Such parallelism in turn insures that the rolling contact between the roller and the two bearing surfaces will remain substantially uniform across the entire length of the roller bearing, instead of degenerating into one point contact along one end of the roller or the other.

The rotary tool connecting assembly of the invention is particularly well adapted for use as a tap driver since it is capable of transmitting large amounts of torque to a tapping tool while allowing such a tool to move freely in the axial direction with respect to the chuck body. Moreover, the assembly is relatively easy to manufacture and to disassemble for maintenance purposes, and is relatively more durable than many prior art designs.

BRIEF DESCRIPTION OF THE SEVERAL FIGURES

FIG. 4 is a front cross-sectional view of the tap driver assembly illustrated in FIG. 2 along the line 4—4;

FIG. 5 is a front view of the tap driver assembly illustrated in FIG. 2 along the line 5—5; and FIG. 6 is an enlarged, cross-sectional view of the area circled in FIG. 5, illustrating the configuration of retaining pins which retains the spring that rotationally biases the locking collar of the assembly.

DETAILED DESCRIPTION OF THE PREFERRED EMBODIMENT GENERAL OVERVIEW OF THE PREFERRED EMBODIMENT

Figure 1:
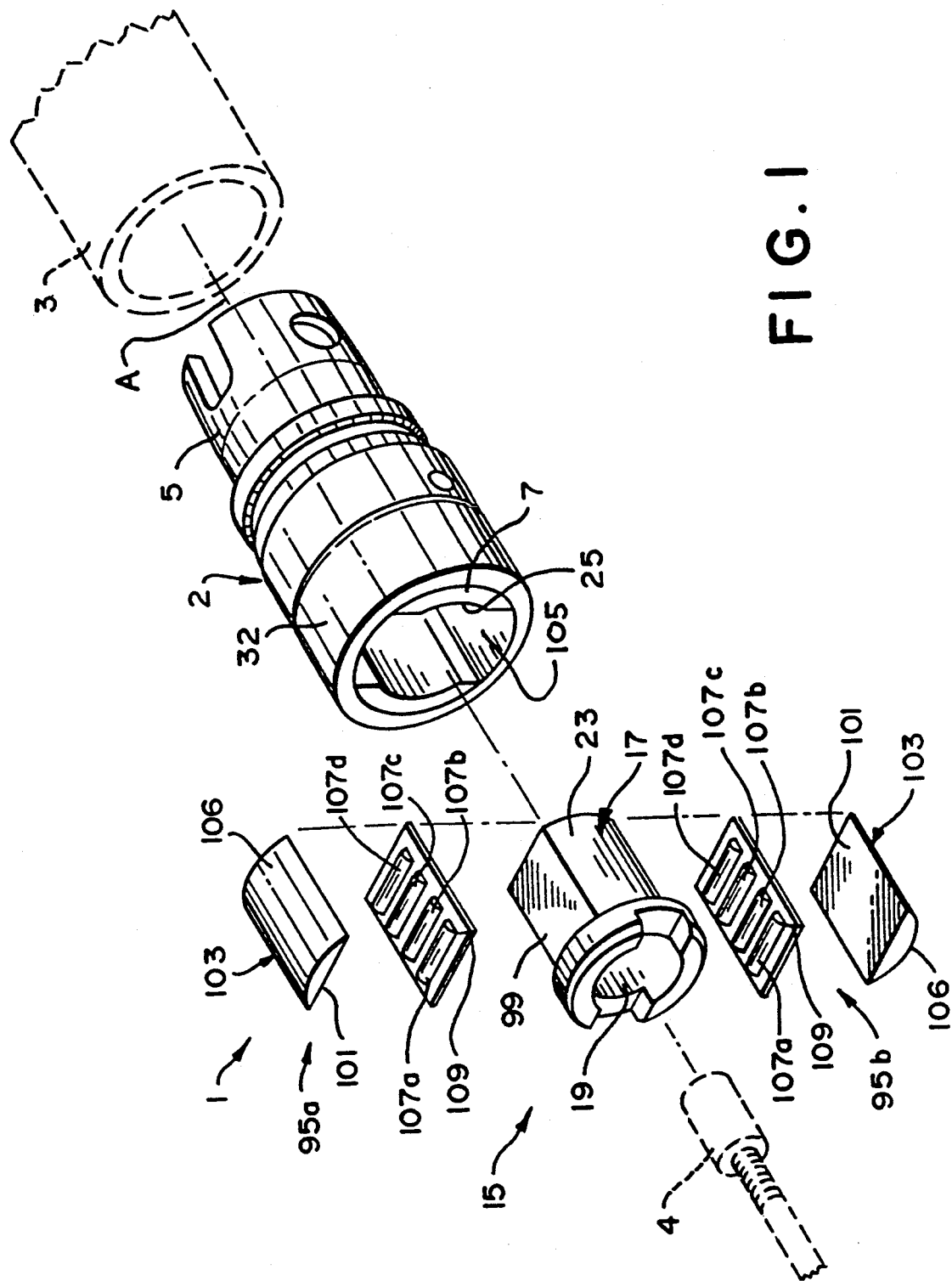
FIG. 1 is a perspective, partially exploded view of a tap driver assembly made in conformance with the invention, illustrating in particular the linear roller assembly that transmits torque between the tap adapter receiver and the chuck body which slidably receives it.

With reference now to FIG. 1, the tap driver assembly 1 of the invention generally comprises a chuck body 2 whose proximal end is connectable to a rotating, torque-generating spindle 3 and whose distal end is adapted to receive and secure a tap adapter 4 by means of an adapter receiver assembly 15. The adapter receiver assembly 15 includes a cup-shaped receiver housing 17 that is axially movable within a cylindrically-shaped recess within the chuck body 2. When the proximal end of the chuck body 2 is secured to the rotating spindle 3, torque is transmitted to the receiver housing 17 from the distal end of the chuck body 2 by means of a pair of linear roller assemblies 95a,b as shown. As will be described in more detail hereinafter, each of the linear roller assemblies 95a,b includes a roller receiving cavity 97 formed from a single flat wall on the outer surface of the adapter receiver housing 17, and a flat bearing wall 101 of a bearing insert 103 which is insertable into and removable from a slot 105 located at the distal end of the chuck body 2. Three linear rollers 107a,b,c rotatably mounted in a nylon roller cage 109 are disposed in the roller receiving cavities 97 of each of the linear roller assemblies 95a,b. The provision of rollers that are proportioned relatively long relative to their diameters between the broad, flat walls provided in the adapter receiving housing 17 and on the bearing insert 103 advantageously provides a mechanism which allows the adapter receiver housing 17 to freely move in and out of a recess in the chuck body 2 along the axis of rotation of the chuck body while at the same time transmitting large amounts of torque from the chuck body 2 to the adapter receiver housing 17.

SPECIFIC DESCRIPTION OF THE STRUCTURE AND OPERATION OF THE PREFERRED EMBODIMENT

Figure 2:
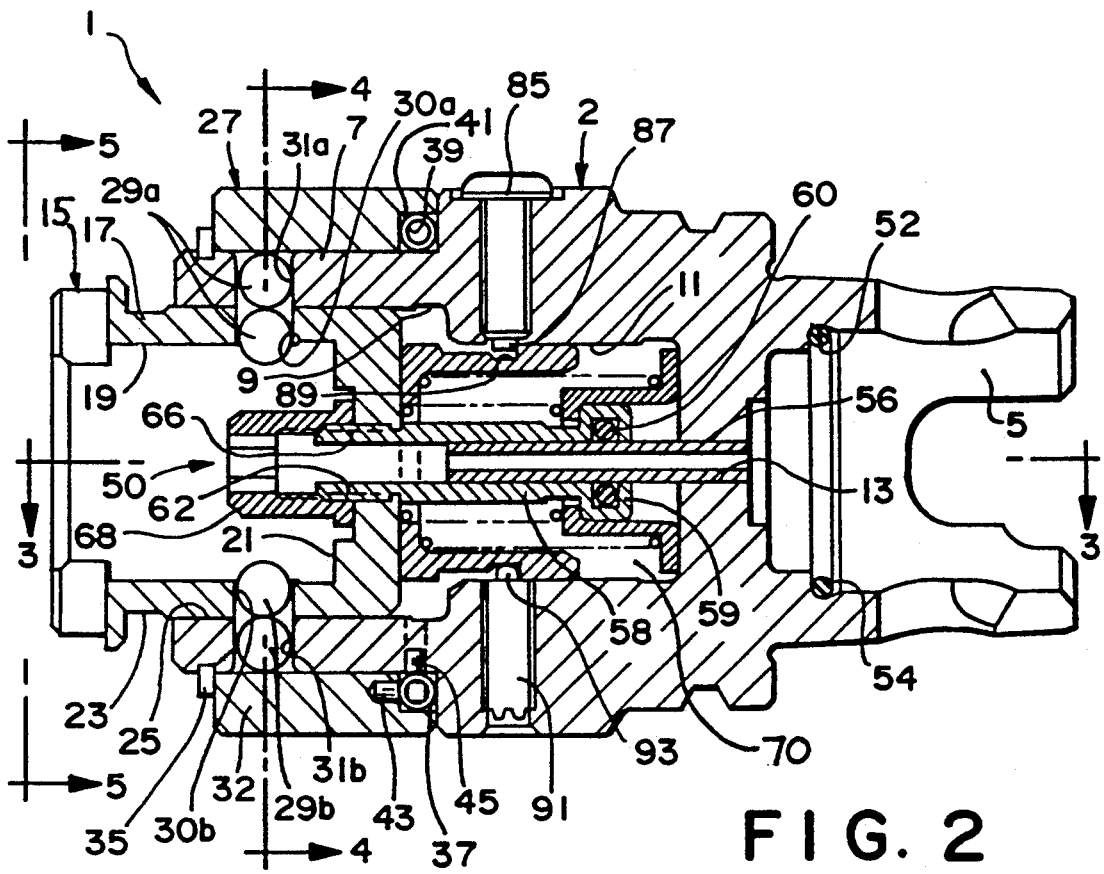
FIG. 2 is a cross-sectional top view of the tap driver assembly illustrated in FIG. 1.

With reference now to FIG. 2, the chuck body 2 of the tap driver assembly 1 includes on its proximal end a tubular connector 5 which is preferably a "Quick Change" coupling of the type sold by Kennametal, Inc., located in Latrobe, Pennsylvania. The frustro-conical shape of the connector 5 causes the axis of rotation A of the chuck body 2 to become quickly and securely aligned with the axis of rotation of the rotating spindle 3. Located at the distal end of the chuck body 2 is a cylindrical flange 7 which circumscribes and defines a cylindrical recess 9 which, as indicated earlier, slidably receives the receiver housing 17 of the adapter receiver assembly 15. Immediately behind the distally-disposed cylindrical recess 9 is a smaller centrally-disposed cylindrical recess 11. Disposed between the recess 11 and the interior of the tubular connector 5 is an even smaller proximally disposed bore 13 which, like the previously-described recesses 9 and 11, is aligned along the axis of rotation of the chuck body 2. The purpose of the centrally- disposed cylindrical recess 11 and the proximally disposed bore 13 is to house various components of both the coolant conduction system 50 and spring loading assembly 70 of the tap driver assembly 1, whose specific structures and functions will be described in detail hereinafter.

With reference again to FIG. 2, the adapter receiver assembly 15, includes a cup-shaped receiver housing 17 having an inner, cylindrically shaped recess 19 for receiving a tap adapter 4. To this end, the distal end of the receiver housing 17 is open, while the proximal end of the housing 17 terminates in a circular end wall 21. The receiver housing 17 has a cylindrical outer wall 23 which is slidably received within a generally cylindrical inner wall 25 of the cylindrical flange 7 of the chuck body 2 to permit axial movement therebetween.

Figure 3:
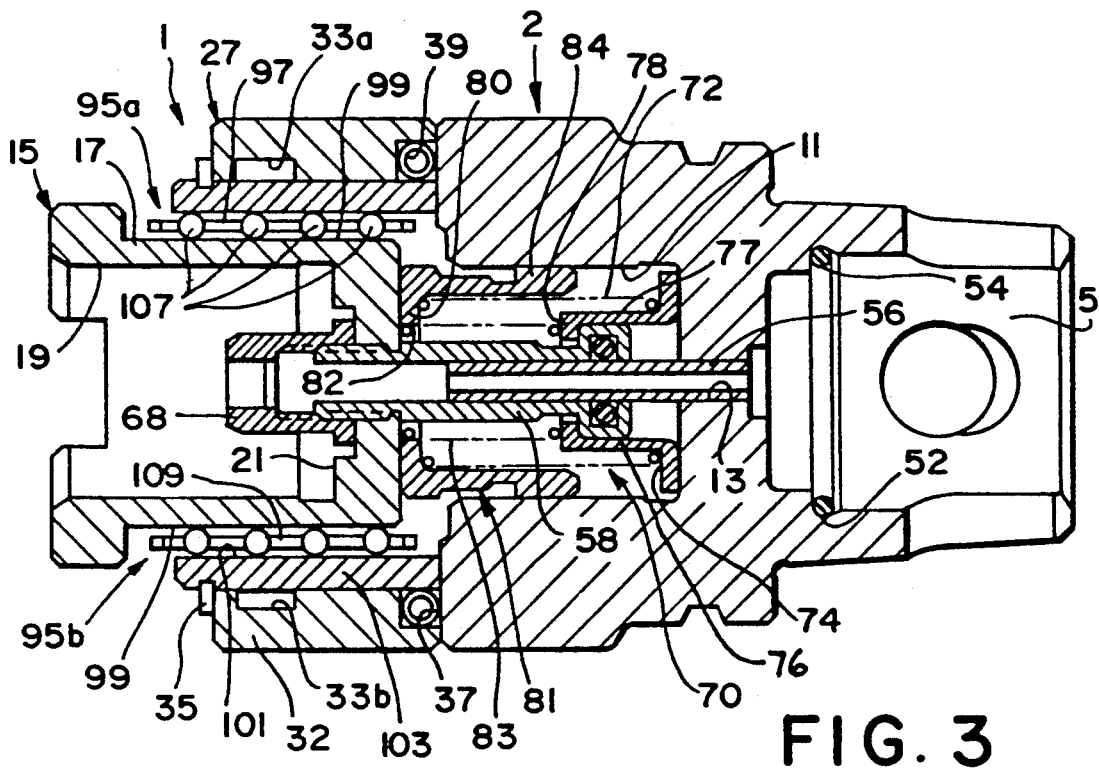
FIG. 3 is a cross-sectional side view of the tap driver assembly illustrated in FIG. 2 along the line 3—3.

With reference now to both FIGS. 2, 3 and 4, the tap driver assembly 1 further includes an adapter receiver lock mechanism 27 for locking a tap adapter 4 into the inner recess 19 of the receiver housing 17. This lock mechanism 27 includes two pairs 29a,b of lock balls. Each of these pairs 29a,b of lock balls are radially movable in a passageway formed by a pair of bores 30a,b located in the receiver housing 17 which in turn are aligned with a pair of bores 31a,b aligned in the cylindrical flange 7 of the chuck body 2. Although not shown in the drawings, the diameter of the bores 30a,b near the inner recess 19 of the receiving housing 17 is slightly reduced so that the lock balls 29a,b may penetrate the recess 19 to capture the tap adapter 4 but may not come completely out of the bores 30a,b. Circumscribing the outer surface of the cylindrical flange 7 of the chuck body 2 is a locking collar 32. As may best be seen with respect to FIGS. 3 and 4, locking collar 32 includes a pair of opposing, ball-receiving recesses 33a,b which allows the two pairs of lock balls 29a,b to move radially outwardly to either release or receive a tap adapter 4 when the locking collar 32 is rotated relative to the chuck body 2 such that these recesses 33a,b become aligned with the bores 31a,b in the cylindrical flange 7. As is best seen in FIGS. 2 and 3, the locking collar 32 is captured between a retaining ring 35 at its distal end and an annular shoulder 37 cut in the chuck body 2 at its other end. Additionally, a torque spring 39 is provided within an inner annular recess 41 into a "closed" position (as shown in FIGS. 2 and 5) wherein the ball receiving recesses 33a,b are out of alignment with the two pairs of lock balls 29a,b. This torque spring 39 is a coil spring whose ends are retained by spring retaining pins 43 and 45 (shown in FIG. 6) which in turn are mounted within bores present in both the locking collar 32 and cylindrical flange 7.

With reference again to FIG. 2, the tap driver assembly 1 includes a coolant conduction system 50 housed within the centrally disposed, cylindrical recess 11 and bore 13 for conducting coolant from a source (not shown) in the rotating spindle 3 all the way to the tap held by the tap adapter 4. Starting at the proximal end of the chuck body 2, this system 50 includes an annular O-ring housing 52 in the form of a groove which circumscribes the inner surface of the tubular connector 5 which in turn houses O-ring 54. The purpose of the O-ring 54 is to sealingly engage a nozzle (not shown) which extends up through the rotating spindle and which in turn is connected to the previously mentioned coolant source. A proximal cooling conduit 56 is disposed within the previously mentioned bore 13 for conducting coolant into a distal coolant conduit 58. Conduit 58 slidably receives the distal end of the proximal coolant conduit 56 in telescopic fashion. The proximal end of the distal coolant conduit 58 includes a toroidal-shaped housing which contains an O-ring 60. The purpose of the O-ring 60 is to provide a leak tight seal between the telescopically mated ends of the proximal coolant conduit 56 and the distal coolant conduit 58. The distal end 62 of the distal coolant conduit 58 is threaded to mate with a threaded opening 66 that is centrally disposed in the circular wall 21 of the receiver housing 17. A coupling nipple 68 is screwed onto that portion of the threaded distal end 62 of the distal coolant conduit 58 which extends beyond the circular wall 21. The threaded engagement between the distal coolant conduit 58 and the receiver housing 17 causes the proximal and distal coolant conduits 56, 58 to slidably move relative to one another in telescopic fashion whenever the receiver housing 17 is moved axially with respect to the chuck body 2. In operation, the coupling nipple 68 engages in leak-tight relationship with a fluid coupling (not shown) in the tap adapter 4 so as to convey coolant fluid completely through the chuck body 2 and into the shank of a tap.

With reference now to FIG. 3, the tap driver assembly 1 further includes a spring loading assembly 70 contained within the centrally disposed cylindrical recess 11 of the chuck body 2. This spring loading assembly 70 includes an outer coil spring 72 whose proximal end engages the outer annular flange 74 of a hat-shaped retaining element 76. This hat-shaped retaining element 76 includes a tubular portion 77 that terminates in an annular retaining wall 78 which limits the axial stroke of the toroidal-shaped O-ring housing 59 that forms the proximal end of the distal coolant conduit 58. As is further evident in FIG. 3, the distal end of the outer coil spring 72 engages an annular end wall 80 of a cup-shaped spring bushing 81. While the spring bushing 81 is axially movable within the centrally disposed cylindrical recess 11, the extent of the axial movement is limited by a retaining screw 85 (as may be seen in FIG. 2). Hence, the distal end of the outer coil spring 72 reacts against the annular end wall 80 of the spring bushing 81 and constantly applies a compressive force against the hat-shaped element 76, which in turn allows the annular retaining wall 78 of the retaining element to retain the combination of the receiver housing 17, the distal coolant conduit 58, and the coupling nipple 68 within the chuck body 2, the retaining force being equal to the compressive force exerted by the outer coil spring 78.

Concentrically disposed between the outer coil spring and the distal coolant conduit 58 is a inner coil spring 83. The distal end of the inner coil spring 83 abuts against the back side of circular end wall 21 of receiver housing 17 through a circular opening defined by the outer edge of the annular end wall 80 of the spring bushing 81, while the distal end of this spring reacts against the annular retaining wall 78 of the hat-shaped retaining element 76. As will be described in more detail hereinafter, the ultimate purpose of the inner coil spring 83 is to provide a controllable "start up" compressive force for the tap held by the tap adapter 4 when it is initially fed into a bore to be threaded which may be different from the axial feed force that the spindle 3 applies to the chuck body.

Turning again to the structure of the spring bushing 81, this element is circumscribed by an annular guide wall 84 which is closely dimensioned to the walls of the centrally disposed, cylindrical cavity 11, such that the bushing 81 maintains concentricity within the recess 11 as it moves axially within this recess. To limit the axial stroke of the spring bushing 81, the previously mentioned retaining screw 85 is provided. This screw 85 terminates in a detent 87 which retainingly abuts against the side wall of a groove 89 which circumscribes the distal edge of the annular guide wall 84. As is further evident in FIG. 2, a spring plunger 91 is provided in a threaded bore in opposition from the retaining screw 85. This plunger 91 terminates in a spring loaded detent 93 which also extends into the groove 89 disposed around the distal edge of the annular guide wall 84. The purpose of the spring plunger 91 is to provide some adjustability as to the amount of "start up" force that the spring loading assembly 70 can apply to a tap connected to the adapter receiver assembly 15 through a tap adapter 4. When this spring plunger 91 is screwed radially toward the groove 89, it increases the amount of force that must be applied onto the receiver housing 17 before the housing 17 will slidably and axially move back into the distally disposed cylindrical recess 9. The spring plunger 91 is often screwed inwardly toward the groove 89 to increase the "start-up" force in instances where the bore to be tapped is formed from a particularly hard metal which in turn requires a relatively large amount of compressive force between the end of the tap and the bore before the tap will begin to thread itself into the bore.

With reference now to FIGS. 1, 3 and 4, the torque transmitting mechanism of the assembly 1 comprises a pair of opposing linear roller assemblies 5a,b which allow large amounts of torque to be transmitted from the spindle 3 to the chuck body 2 and to the receiver housing 17 while still allowing the housing 17 to freely slide in the axial direction within the cylindrical recess 9. Each of the linear roller assemblies 95a,b includes a roller-receiving cavity which is formed in part from a flat wall 99 disposed on one of the sides of the outer cylindrical wall 23 of the housing 17, and an opposing, spaced apart flat bearing wall 101 provided on a bearing insert 103. The bearing insert 103 of each of the linear roller assemblies 95a,b fits in a slot 105a,b formed in the cylindrical flange 7 that defines the cylindrical recess 9. Further, each of the bearing inserts 103 includes an arcuate back surface 106 which is complementary in shape to the inner annular wall of the locking collar 32. While not specifically shown in the several drawings, the side edges of the bearing insert 103 of each of the linear roller assemblies 95 are dimensioned so that they do not tightly abut the walls of their respective slot 105 when they are inserted into the position illustrated in FIGS. 3 and 4. Such dimensioning in combination with the arcuate interface between the back surfaces 106 of the inserts 103 in the inner annular wall of the locking collar 32 allows each of the inserts to compliantly "rock" slightly on the order of a few thousands of an inch. The ability of each of the inserts 103 to rock within its respective slot 105 in turn allows it to maintain its respective bearing wall 101 in parallel relationship with its respective opposing flat wall 99 on the adapter receiver housing 17 under high torque conditions which will tend to rotate the housing 17 relative to the cylindrical flange 7 of the chuck body 2. The maintenance of a parallelism between the opposing walls 99 and 101 which make up the roller receiver cavities 97 of each of the linear roller assemblies 95a,b in turn insures that a uniform line engagement will be maintained between these walls and the three linear rollers 107a,b,c that are disposed in each of the cavities 97, even under high torque conditions. Such uniform contact completely along the length of each of the linear rollers 107a,b,c not only minimizes the amount of friction experienced by the recess defined by the cylindrical flange 7 of the chuck body 2, but further reduces the amount strain and wear that would occur between the linear rollers 107a,b,c and their respective bearing walls 99, 101 if these walls ever became non-parallel during the application of high amount of torque, which in turn would cause a point-type contact to occur between the ends of the rollers and their respective bearing walls. Such a point-type contact would generate localized stresses in both the ends of the rollers and their respective bearing walls which could act to deform the rollers, or create shallow grooves in the bearing walls 99, 101.

The rollers 107a,b,c are preferably dimensioned such that their lengths are at least two and preferably about four times their diameters. Additionally, the diameters of the rollers 107a,b,c are preferably rendered small in relation to the thickness of the walls of the adapter receiver 17. Such dimensioning maximizes the linear engagement between the rollers 107a,b,c and their respective bearing walls 99, 101 without causing the walls of the adapter housing 17 to become unduly thinned by the chorded cut necessary to form the bearing walls 99. The rollers 107a,b,c are further preferably captured within a roller cage 109 formed from a self-lubricating plastic material, such as nylon. While not specifically shown in the drawings, the resiliency of the plastic that forms the roller cage 109 allows the rollers 107a,b,c to be "snap fitted" into roller receiving openings in the cage 109 in such a way that they are captively rotatably mounted within the cage, which in turn facilitates the insertion and removal of the rollers 107a,b,c from their respective roller receiving cavities 97. Even more importantly, the roller cage 109 prevents the circular end surfaces of the rollers 107a,b,c from engaging the walls of the slot 105 which defines the sides of the roller receiving cavity 97, and further prevents the cylindrical surfaces of adjacent rollers from rubbing against one another during such operation. As either type of unwanted rubbing could significantly increase the amount of friction experienced by the receiver housing 17 as it axially moves within the cylindrical recess 9 of the chuck body 2, the elimination of these sources of friction is a significant factor in providing a mechanism that is capable of transmitting large amounts of torque while at the same time allowing free axial movement between the receiver housing 17 and the inner wall of the cylindrical recess 9 which receives it.

While two mutually opposing linear roller assemblies 95a,b are illustrated with reference to the preferred embodiment of the invention, it is within the scope of the invention to use only a single linear roller assembly. Many other changes and modifications to the tap driver assembly of the invention will become evident to a purpose of ordinary skill in the art. All such changes and modification are intended to be encompassed within the scope of this invention, which is confined only by the scope of the claims appended hereto.

What is claimed is:

1. A rotary tool connecting assembly for transmitting torque to a rotary tool from a rotating, torque-generating spindle while allowing axial linear movement to occur between said tool and said spindle, comprising:

a receiver for receiving and securing an end of said rotary tool;

a chuck body having an axis of rotation, and one end connectable to a torque-generating spindle, and an opposing end having an axially aligned recess for slidably receiving said receiver, and means for transmitting torque from said chuck body to said receiver while allowing said receiver to axially slide within said recess, including at least one linear roller bearing rollingly engaged between only a single flat wall of said receiver and a flat wall defining a portion of said recess in said chuck body.

2. The rotary tool connecting assembly defined in claim 1, further comprising means for preventing the end surfaces of said linear rolling bearing from coming into contact with any wall of said chuck body.

3. The rotary tool connecting assembly defined in claim 1, wherein said torque transmitting means includes a plurality of linear roller bearings, and further comprising means for preventing said bearings from contacting one another when said receiver slidably moves within said recess.

4. The rotary tool connecting assembly defined in claim 1, wherein said receiver has a generally cylindrical outer surface, and wherein said single flat wall is parallel to said axis of rotation of said chuck and is defined along a chord in said cylindrical outer surface.

5. The rotary tool connecting assembly defined in claim 1, wherein said flat wall of said recess is defined by a single flat surface on one side of the bearing insert that is insertable within and removable from a slot in said opposing end of said chuck body.

6. The rotary tool connecting assembly defined in claim 1, wherein said flat wall of said recess is defined by a single flat surface on one side of a bearing insert that is compliantly movable with respect to said chuck body for maintaining a parallel relationship between said insert flat surface and said flat wall portion of said receiver such that substantially the entire length of said roller bearing remains rollingly engaged between said flat walls despite the application of relative torque between said receiver and said chuck body.

7. The rotary tool connecting assembly defined in claim 2, wherein said prevention means includes a bearing cage.

8. The rotary tool connecting assembly defined in claim 5, wherein said bearing insert is formed from a material substantially harder than the material forming the chuck body.

9. The rotary tool connecting assembly defined in claim 1, wherein said rotary tool is a tap, and said receiver receives a tap adapter.

10. The rotary tool connecting assembly defined in claim 6, wherein said insert includes an arcuate side opposite to said flat side which compliantly moves in response to said relative torque by rocking within said slot.

11. A rotary tool connecting assembly for transmitting torque to a rotary tool from a rotating, torque-generating spindle while allowing axial linear movement to occur between said tool and said spindle, comprising:

an adapter receiver for receiving and securing a tap adapter;

a chuck body having an axis of rotation, and one end having means for detachably connecting the body to said spindle, and an opposing end having an axially aligned recess for slidably receiving said adapter receiver, and means for transmitting torque from said chuck body to said receiver while allowing said receiver to axially slide within said recess of said chuck body, including a linear roller receiving cavity defined between a single flat wall portion of said receiver and, a flat wall defining a portion of said recess that is parallel to said receiver flat wall portion, and two opposing side walls in said chuck body end that are contiguous with said recess defining flat wall, and at least one linear roller bearing rollingly engaged between said flat walls of aid receiver and said recess.

12. The tap driver assembly defined in claim 11, wherein the length of said linear roller bearing is at least twice its diameter.

13. The tap driver assembly defined in claim 11, further comprising means for preventing the end surfaces of said linear roller bearing from coming into contact with said opposing side walls of said bearing cavity.

14. The tap driver assembly defined in claim 11, wherein said torque transmitting means includes a plurality of linear roller bearings, and further comprising means for preventing said bearings from contacting one another when said receiver slidably moves within said recess.

15. The tap driver assembly defined in claim 11, wherein said receiver has a generally cylindrical outer surface, and wherein said single flat wall is parallel to said axis of rotation of said chuck and is defined along a chord in said cylindrical outer surface.

16. The tap driver assembly defined in claim 11, wherein said flat wall of said recess is defined by a single flat surface on one side of the bearing insert that is insertable within and removable from a slot in said opposing end of said chuck body.

17. The tap driver assembly defined in claim 15, wherein said opposing side walls of said roller receiving cavity are formed by opposing walls of said slot in said opposing end of said chuck body.

18. The tap driver assembly defined in claim 11, wherein said flat wall of said recess is defined by a single flat surface on one side of a bearing insert that is compliantly movable with respect to said chuck body for maintaining a parallel relationship between said insert flat surface and said flat wall portion of said receiver such that substantially the entire length of said roller bearing remains rollingly engaged between said flat walls despite the application of relative torque between said receiver and said chuck body.

19. The tap driver assembly defined in claim 13, wherein said prevention means is a roller bearing cage that also functions to prevent the end surfaces of said roller bearings from coming into contact with said side walls of said bearing receiving cavity.

20. The tap driver assembly defined in claim 15, wherein said bearing insert has a hardness of approximately 60C Rockwell.

21. The tap driver assembly defined in claim 11, further comprising a spring loading mechanism disposed within said chuck body and connected to said adapter receiver for resisting relative linear movement between said adapter receiver and chuck body.

22. A tap driver assembly for transmitting torque to a tap from a rotating, torque-generating spindle while allowing axial linear movement to occur between said tap and said spindle, comprising:

an adapter receiver for receiving and securing a tap adapter, wherein said receiver has a generally cylindrical exterior;

a chuck body having an axis of rotation, and one end having means for detachably connecting the body to said spindle, and an opposing end having an axially aligned, generally cylindrically-shaped recess that is complementary in shape to said adapter receiver for slidably receiving said receiver, the axis of rotation of said recess being collinear with the axis of rotation of said chuck body; and means for transmitting torque from said chuck body to said receiver while allowing said receiver to axially slide within said cylindrical recess of said chuck body, including a linear bearing receiving cavity formed in part between a single flat wall in said adapter receiver defined along a chord in the generally cylindrical exterior of said adapter, and a flat wall defining a portion of said recess in said chuck body, and at least one linear roller bearing rollingly engaged between said flat walls of said receiver and said recess.

23. The tap driver assembly defined in claim 21, wherein said flat wall of said recess is defined by a single flat surface on one side of the bearing insert that is insertable within and removable from a slot in said opposing end of said chuck body.

24. The tap driver assembly defined in claim 22, further comprising an annular locking collar circumscribing said opposing end of said chuck body for securing a tap adapter in said adapter receiver, and wherein said insert has an arcuate surface that opposes its flat surface and which is supported by an inner annular surface of said locking collar.

25. The tap driver assembly defined in claim 23, wherein the arcuate surface of said bearing insert is generally complementary in shape to the inner annular surface of said locking collar, and wherein said insert can compliantly rock on said inner annular surface to keep its flat surface generally parallel with the flat surface of said receiver in response to the application of torque between said receiver and said chuck body.

26. The tap driver assembly defined in claim 21, wherein the length of said linear roller bearing is at least twice its diameter.

* * * * *